455-603
11/13/84
AU 263 [X
XP 4,482,947

United States Patent [19]
Zato et al.

[11] Patent Number: 4,482,947
[45] Date of Patent: Nov. 13, 1984

[54] MULTI-FUNCTION, MULTI-UNIT REMOTE CONTROL SYSTEM AND METHOD THEREFOR

[75] Inventors: Thomas J. Zato, Palatine; Peter C. Skerlos, Arlington Heights, both of Ill.

[73] Assignee: Zenith Electronics Corporation, Glenview, Ill.

[21] Appl. No.: 367,827

[22] Filed: Apr. 12, 1982

[51] Int. Cl.³ .............................................. G05B 19/00
[52] U.S. Cl. ................. 364/138; 340/825.76; 358/194.1; 364/140; 455/603
[58] Field of Search ............... 364/140, 141, 146, 709, 364/138, 139; 455/352–355, 603, 608, 617–619, 151; 340/825.71–825.76; 358/194.1

[56] References Cited

U.S. PATENT DOCUMENTS

| | | | |
|---|---|---|---|
| 4,010,423 | 3/1977 | Collins et al. | 340/825.76 |
| 4,177,453 | 12/1979 | Collins | 340/825.76 X |
| 4,231,031 | 10/1980 | Crowther et al. | 455/603 X |
| 4,246,611 | 1/1981 | Davies | 358/194.1 |
| 4,291,385 | 9/1981 | Osborne et al. | 364/709 |
| 4,318,130 | 3/1982 | Heuer | 358/194.1 X |
| 4,338,632 | 7/1982 | Falater | 358/194.1 |
| 4,356,509 | 10/1982 | Skerlos | 455/603 X |

FOREIGN PATENT DOCUMENTS 2756327 4/1978 Fed. Rep. of Germany .

OTHER PUBLICATIONS

A Pulse Position Modulation Transmission System for Remote Control of a TV Set., H. J. Casier, H. J. de Man, C. Matthijs, pp. 801–808, IEEE Journal of Solid State Circuits, vol. SC-11, No. 6, Dec. 1976.

Primary Examiner—Joseph F. Ruggiero

[57] ABSTRACT

A system for remotely controlling several devices in which both the indicia identifying the controlled device as well as the function indicia are generated by means of the selection of a single input control. A keyboard is bi-directionally scanned in detecting the user-selected input control signal. The control signal is then decoded to provide an indication of the function input signal as well as an indication of the particular device being addressed. The thus decoded signals are then used to generate a predetermined output pulse code for remotely controlling one of a plurality of functions in one of the plurality of controlled devices. The output pulse code includes a start bit (or bits) and various numbers and combinations of data bits depending upon the device addressed. The indicia identifying the controlled device are generated either by hard-wiring an address decoder to the user-operated input signal generator, i.e., a keyboard, or by storing address information in a programmable memory and recalling this information in response to the control input selected. The various devices controlled are responsive to unique start bit and data bit combinations in the form of ternary digital signals having three possible states which provide an increased number of available codes. The use of a single input control for generating device addresses as well as control function information eliminates the need for multiple control signal entries, a mode switch for selecting a particular device or for sequentially transmitting address and function control signals.

12 Claims, 9 Drawing Figures

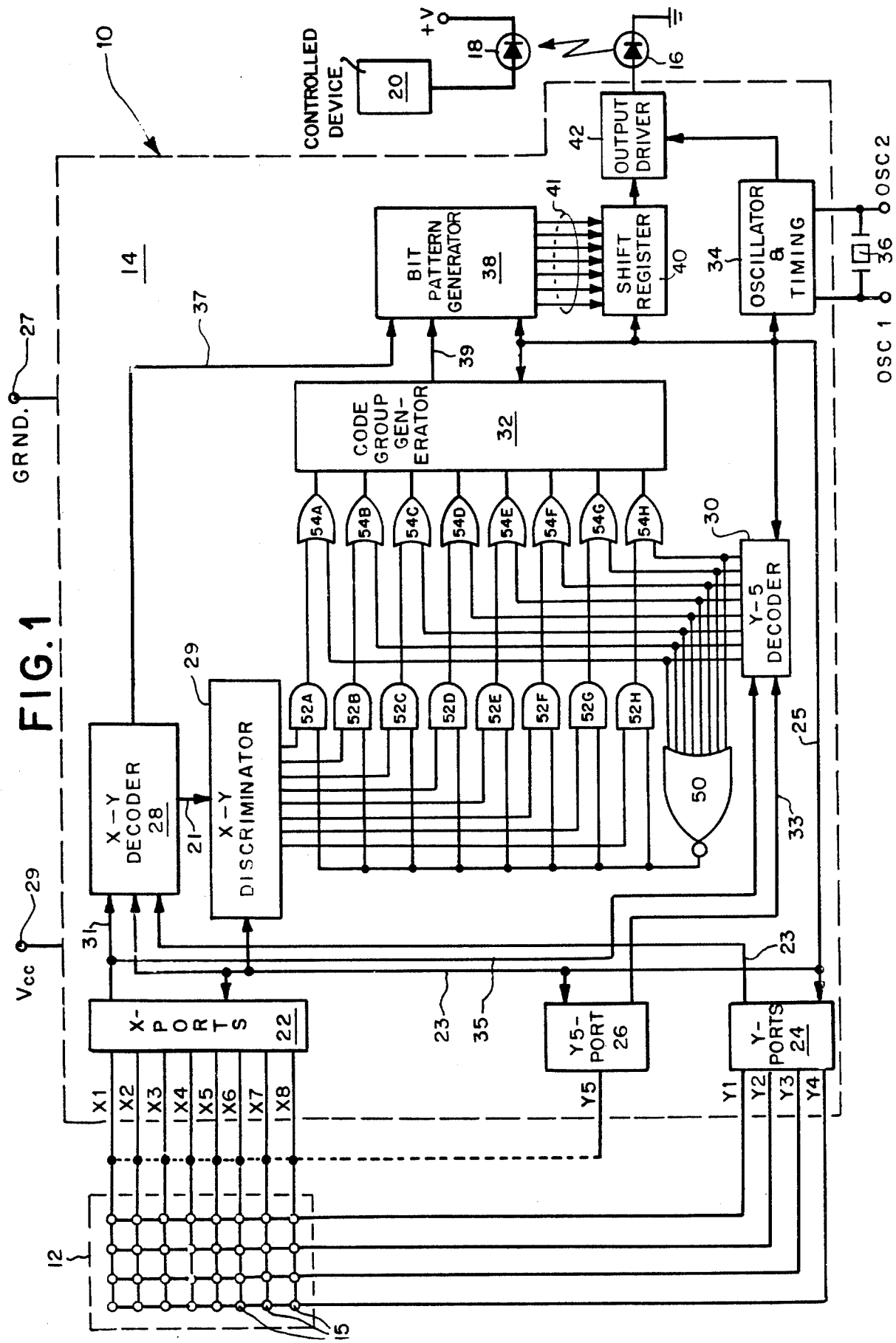

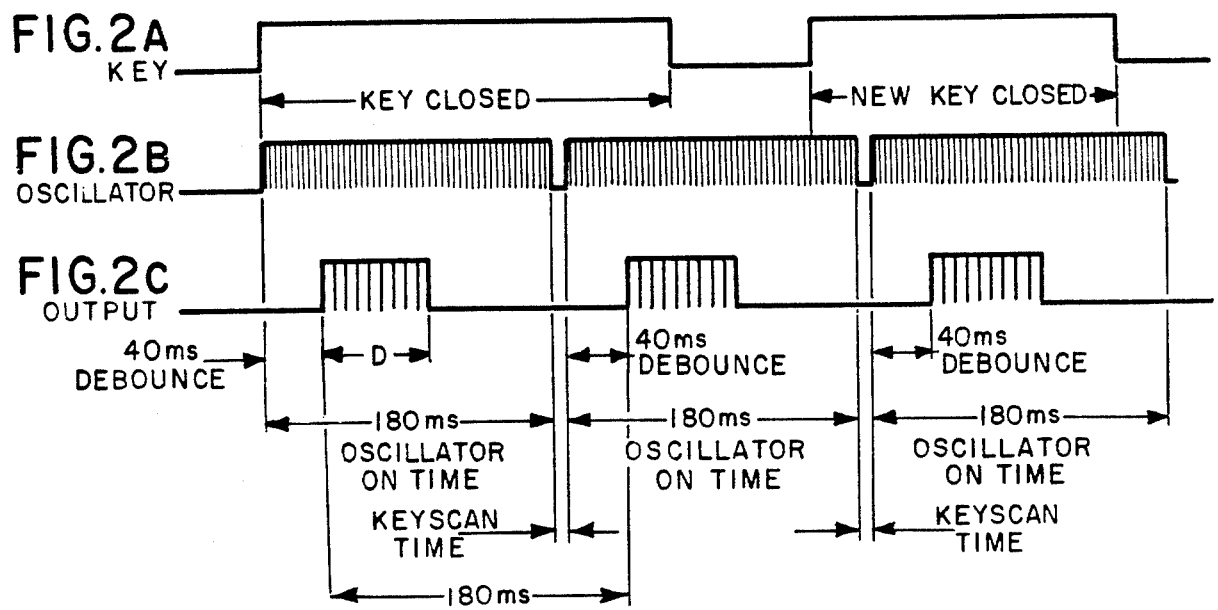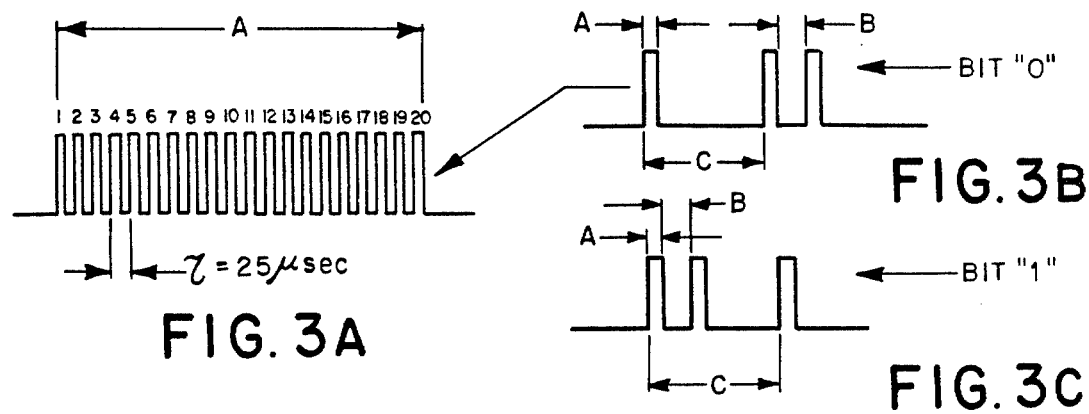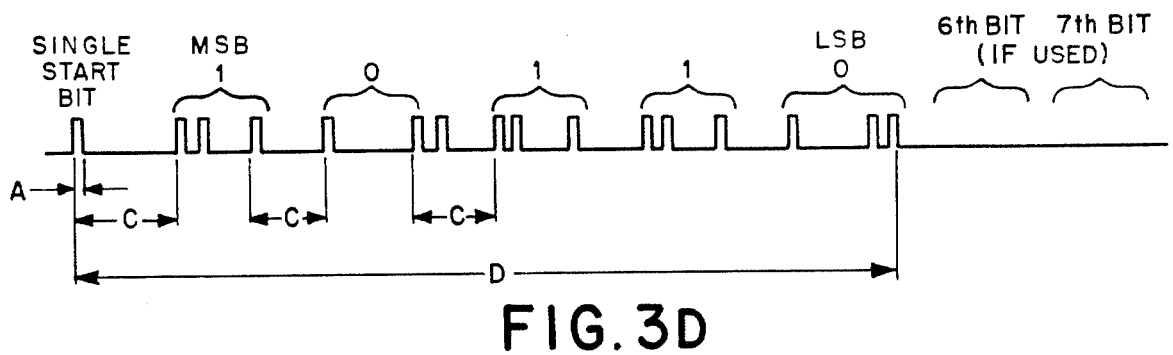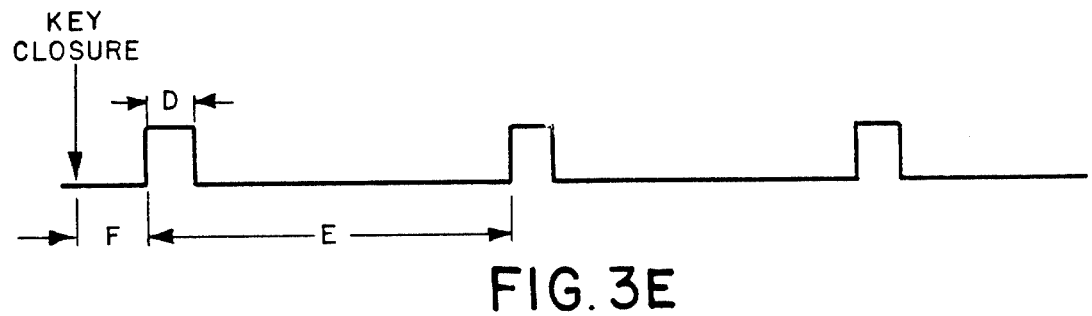

MULTI-FUNCTION, MULTI-UNIT REMOTE CONTROL SYSTEM AND METHOD THEREFOR

BACKGROUND OF THE INVENTION

This invention generally relates to remote control systems and more specifically is directed to a remote control system and method therefor for controlling several operating functions in each of a plurality of controlled devices.

Wireless remote control systems have been in use for many years for remotely controlling such things as model airplanes, toy automobiles, a great variety of industrial machines, and home entertainment devices. The systems are generally implemented by means of either an ultrasonic or an optical, e.g., infrared, communication link. The transmitted signals are generated in response to user inputs provided to a matrix-type keyboard. Each key on the keyboard represents a controllable function available in the device for regulating its operation. The number of such controllable functions is generally limited by the number of keys that can be conveniently placed on the keyboard, rather than by the number of functions which can be performed by the circuitry insde the controlled device.

The tendency today is toward controlling not only more functions in the remotely operated device, but also toward controlling more than one, and in many cases a large number of remote devices. This is particularly true in the home environment where entertainment appliances are being used in increasingly larger numbers. The desirability of remotely controlling several home entertainment devices by means of a single control panel is obvious. However, the increasing number of available, controllable functions in combination with the ever increasing number of home entertainment devices has severely taxed current remote control systems. In addition, some of the techniques recently undertaken for controlling several such devices have involved such new designs and radical departures from earlier remote control systems that integration of these earlier systems with the new approaches is not technically feasible as a practical matter.

To realize these additional control and address functions without adding a corresponding number of different control frequencies or transmitted pulse codes, some of the newer systems use combinations of a basic set of control signals transmitted either in certain sequences or coincidentally. In this way, for instance, a few basic control signals may be utilized to control a larger number of different functions and devices. However, this has led to significant complexity at the receiver end of the remote control system, particularly in terms of decoding schemes, while at the same time allowing for the possibility of greater confusion of the inexperienced user and enhanced susceptibility to unwanted noise.

One approach to remotely controlling several devices by means of either an ultrasonic or infrared link is described in "A Pulse Position Modulation Transmission System For Remote Control Of A TV Set", IEEE Journal of Solid State Circuits, Vol. SC-11, No. 6, Pages 801-808, December 1976, by Casier, et al. In this article is described a pulse position modulation transmission system in which up to 32 commands can be generated by means of an 8×4 matrix keyboard and encoded into 5-bit pulse position modulated (PPM) words. Also disclosed is the use of a double throw switch incorporated in the keyboard to insert a different RC time constant in the transmitter circuit in providing for the generation of a second set of 32 control signals for controlling, for example, another device. Another approach is disclosed in West German Pat. No. 27 46 532 filed Oct. 17, 1977 to Kanow which contemplates the use of a remote control system for radio and television receivers utilizing separate data and address buses connected to a single chip microcomputer in the remote control receiver for processing address and function control signals.

U.S. Pat. No. 4,010,423 to Collins, et al and assigned to the assignee of the present application describes a remote control system in which the frequency of input control signals is used to selectively initiate a first mode in which two preselected frequencies control a multi-state bidirectional function (volume) and a second mode in which the same two preselected frequencies control a multi-state cyclic function (volume) and a distinct bistable function (picture control). Still another approach to expanding the capability of remote control systems is disclosed in U.S. patent application Ser. No. 57,053, filed July 12, 1979 U.S. Pat. No. 4,377,006 in the names of Collins and Hendrickson in which is disclosed a remote control system for a television receiver in which a multibit code identifying a selected function of the television receiver includes a plurality of data bits comprised of either a single pulse representing a first logic state or a grouping of at least two relatively closely spaced pulses representing a second logic state. By selectively positioning these two logic states in various combinations as the start bit, or bits, of a logic word, various functions and devices may be addressed and controlled by a single remote transmitter. Finally, U.S. Pat. No. 4,291,385 to Osborne, et al is directed to a calculator keyboard for allowing a single key to perform various functions as desired. This is accomplished by means of a prefix key which is selected prior to engagement of the desired function key.

The present invention is intended to avoid the aforementioned limitations by providing a remote control system and method therefor which permits a large number of devices each having a plurality of functions to be simultaneously controlled without the need for additional input controls or mode switches. In addition, this increased control capability is made available without the use of a microcomputer, additional data lines, or increased bit size of the control words.

OBJECTS OF THE INVENTION

Accordingly, it is an object of the present invention to provide an improved system and method for remotely controlling a plurality of devices.

It is another object of the present invention to provide an improved remote control system and method therefor for selectively regulating a plurality of functions in each of a plurality of controlled devices by means of a single control entry.

Still another object of the present invention is to provide a remote control system and method therefor for controlling a plurality of devices in which the indicia identifying the control device and the function indicia are integrated in a single control signal generated by means of a single user entry.

It is yet another object of the present invention to provide an improved system and method for remotely controlling a plurality of home entertainment devices which is compatible with currently available television receiver remote control systems.

A still further object of the present invention is to provide an improved system and method for remotely controlling a plurality of devices each having a plurality of controllable functions wherein the control signals are generated by a single user entry without the need for an output signal mode control switch.

Yet another object of the present invention is to provide a new and improved remote control home entertainment device and function selection system and method therefor which permits the selection and control of a large number of functions of any of a plurality of such home entertainment devices and which is compatible with existing remote control systems which are designed for operation with a television receiver only.

BRIEF DESCRIPTION OF THE DRAWINGS

The appended claims set forth those novel features believed characteristic of the invention. However, the invention itself as well as further objects and advantages thereof will best be understood by reference to the following detailed description of a preferred embodiment taken in conjunction with the accompanying drawings, in which:

FIG. 1 shows a block diagram of a remote control system in accordance with the present invention;

FIGS. 2A-2C illustrate a graphical representation of several signal waveforms appearing at selected locations in the remote control system of the present invention; and FIGS. 3A-3E illustrate, in various degrees of expansion, the pulse coded control signals utilized in the present invention.

DESCRIPTION OF THE PREFERRED EMBODIMENT

Referring to FIG. 1, there is shown a multi-function, multi-unit remote control system 10 in accordance with a preferred embodiment of the present invention. Remote control system 10 includes a keyboard 12 having a plurality of user operated push buttons 15 arranged in a matrix format by means of which control inputs are entered. The user initiated control inputs are provided to a controller integrated circuit 14 via a plurality of lines X1 through X8 connected to respective rows of push buttons 15 and lines Y1 through Y4 connected to respective columns of push buttons 15. Controller IC 14 decodes the keyboard generated inputs and converts these commands to a pulse code modulated (PCM) output which is provided to a light emitting diode (LED) 16. LED 16 emits a PCM control signal in the infrared spectrum which is transmitted to and received by a photo diode 18 which, in turn, transmits the coded control signals to a controlled device 20 where the input signals are decoded and used to regulate various functions of the controlled device. For simplicity, only one controlled device 20 is shown in FIG. 1 although in practice the present invention is intended to be utilized with a plurality of such controlled devices, each having a plurality of selectively variable operating parameters.

More specifically, keyboard 12 includes an 8×4 matrix keyboard which includes 32 single-pole, single-throw switches each indicated as a push button control 15. This matrix of user operated switches is connected to a controller IC 14 by means of 12 input/output lines, which are designated as X1-X8 and Y1-Y4. The 32 commands which can be generated by means of the 8×4 matrix keyboard 12 are encoded into multi-bit pulse code modulated (PCM) words which are described in detail below. These input control commands are provided via the aforementioned conducting lines to a plurality of X-ports and Y-ports, shown respectively in FIG. 1 as blocks 22, 24.

The keyboard switches 15 on keyboard 12 are scanned in a bi-directional manner by means of outputs from the X- and Y- ports 22, 24. This is accomplished by means of a plurality of flip-flops (not shown) connected to each of the row and column conducting lines and two logic gates, the inputs to which are provided by the respective, grouped row and column flip-flops. The system first scans in one direction by means of outputting signals via lines X1-X8 to detect the column of the user input provided to Y-ports 24 via one of the lines Y1-Y4. The aforementioned flip-flops are then timed-out and the direction of the sensing signal is reversed by the oscillator timing circuitry 34. An output signal is provided via Y-ports 24 on lines Y1-Y4, with a particular input signal via one of lines X1-X8 providing the row location, or X component, of the user engaged push button switch 15. Thus, the row and column location of the user engaged push button switch 15 is provided to the X- and Y- ports 22, 24, respectively, in the form of a function code. As used hereinafter, a function code designates the particular operating parameter controlled by the engagement of a particular push button switch 15. The details of the scanning of keyboard 12 by means of the output signals from controller IC 14 do not form a part of the present invention and will not be further described herein. A detailed description of this bi-directional scanning of keyboard 12 can be found in West German patent application Ser. No. P27 56 327.5, filed April 20, 1978, in the names of D. Holzmann and J. Grosse and assigned to International Telephone and Telegraph Corporation. As shown in FIG. 1 of the aforementioned German patent application, first and second pluralities of flip-flops are connected to respective row and column conducting lines and to a respective pair of logic gates. Each pair of logic gates includes the combination of a NOR gate and a differentiating circuit, such as a monostable multivibrator. Those portions of the detailed description regarding the detection of user input commands to keyboard 12 contained in the aforementioned West German patent application and directed primarily toward the operation of the aforementioned components are hereby incorporated by reference in the present application. However, the present invention is not limited to operation with this specific keyboard scanning arrangement, but will operate with any of the more common keyboard scanning schemes.

Referring to FIGS. 2A-2C, upon the closure of one of the push button controls 15 on keyboard 12 the oscillator timing circuit 34 in the controller IC 14 operates for a predetermined period, which in a preferred embodiment of the present invention is 180 milliseconds, as shown in FIG. 2B. The key closure signal is provided via one of the Y-ports 24 and the X-Y key detect decoder 28 and associated conductors 23, 25 to the oscillator 34. This input signal initiates the oscillator operation as shown in FIG. 2B. Oscillator timing circuit 34 is driven by a ceramic resonator 36 which, in turn, is energized by oscillator 1 and oscillator 2 drive inputs.

Oscillator 34 is coupled to the X- and Y- ports 22, 24, the X-Y key detect decoder 28, the Y5 decoder 30, the code group generator 32, the bit pattern generator 38, the shift register 40, and the output driver 42. Oscillator timing circuit 34 provides appropriate operational timing sequence signals to these various components for processing of the digital signals provided via the X- and Y- ports 22, 24 to the various pulse decoding components in the controller IC 14. A ground, or reference voltage, terminal 27 is incorporated in the controller IC 14 as well as an input power supply terminal Vcc 29 for energizing the controller integrated circuit 14.

In the idle condition with none of the keys 15 engaged, the output on lines X1–X8 is a logic high. During this interval, the input state on lines Y1–Y4 is a logic low and oscillator timing circuit 34 is in the OFF state. In addition, the state of the output signal on line Y5, which is described in greater detail below, is a high impedance state.

The key scan sequence is initiated upon key closure as shown in FIGS. 2A–2C. Following key closure, a logic high signal is provided from lines X1–X8 through the closed key switch to one of the lines Y1–Y4, depending upon which key 15 is engaged. The Y input is provided to oscillator timing circuit 34 as previously described and initiates the operation thereof. Thus, the 180 millisecond signal processing cycle shown in FIG. 2C is initiated. The signal processing cycle begins with a key debounce time interval (40 milliseconds). Engagement of a push button control 15 must extend at least over this predetermined time interval for verification of a control input in order to make the system less sensitive to spurious inputs. The input provided on one of the lines Y1–Y4 not only initiates oscillator 34 operation, but also after the 40 millisecond key debounce period, stores in the X-Y key detect decoder 28 the Y, or column, location of the selected key via line 23. Following the storage of the Y, or column, information in the X-Y decoder 28, lines X1–X8 are switched to an input, or logic low, state.

Also included in the controller IC 14 is a Y5 port 26 which is connected to the Y5 decoder 30. As shown in FIG. 1 in dotted line form, the Y5 port 26 may be wired to any one of the X1–X8 conductors. If it is so connected to one of these input/output lines, when the X1–X8 conductors transition from an output to an input state by means of a change in the logic level of the signal applied thereto, the Y5 port 26 will similarly transition to an output state. When this occurs, the X-port 22 will be responsive to an input signal provided thereto and provide this input signal to the Y5 decoder 30 via line 35 for processing this information therein. When the X input is provided to the Y-5 decoder 30 via line 35 from one of the X-ports 22, the Y-5 port 26 is turned off (transitions to the high impedance state) and the Y1–Y4 ports 24 then transition to the output state for a reverse scanning of the keyboard 12. This sequential scanning is sensed by the X-ports 22 and loaded into the X-Y decoder 28 via line 31. Thus, the row location of the selected key is then provided to the X-Y decoder 28 for processing therein.

The selection of a given push button control 15 on keyboard 12 will result in the storage of the X-Y matrix location of that push button in the X-Y key detect decoder 28 and the storage of the selected code group in the Y5 decoder 30. The coded signals representing the X-Y matrix location together comprise the function code. The signal provided via line 35 from one of the X-ports 22 to the Y5 decoder represents the code group selected and ultimately defines the start bit and 6th and 7th bits of transmitted information. Similarly, the Y5 decoder 30 is enabled to store and decode information input by the X-ports 22 via line 35 by means of the input signal provided thereto from the Y5 port 26 via line 33. Receipt of this signal by the Y5 decoder 30 initiates the processing of the code group selection signal therein. Thus, the selection of a single push button permits the detection and storage of signals representing the device which is to be controlled, or the code group selection signal, as well as the function code for regulating a particular operating parameter of that device. The configuration of these various input control signals and their processing in the controller IC 14 will be described in detail presently. After receipt of the input control signal by the controller IC 14, a 140 millisecond time interval occurs as provided by oscillator timing circuit 34 after which the system is set to the initial idle condition again and the key closure/detection process is repeated. A new key scan sequence is initiated even if the same key is still depressed. This is shown in FIGS. 2A–2C.

The X-Y key detect decoder 28 receives eight X inputs from the X-ports 22, although for simplicity this connection is shown as a single conductor 31. The X-Y decoder 28 includes conventional logic circuitry which determines when an X input is a logic high and generates a binary number corresponding to that input signal. Similarly, the X-Y decoder 28 receives four inputs from the Y-ports 24 corresponding to the Y1–Y4 conductors. This decoder similarly generates a binary number representing the respective Y input and combines the two binary numbers thus generated in response to the X and Y port values and provides a composite digital signal representing the matrix push button control selected to the bit pattern generator 38 via conductor 37. The coded signal thus provided from the X-Y key detect decoder 28 represents a push button key closure corresponding to one of 32 possible codes. The Y5 decoder 30 is similar to the X-Y key detect decoder 28 in organization and operation in that it also receives binary input signals from the X-ports 22 via line 35 and an enabling signal from the Y5 port 26 via line 33.

The bit pattern generator 38 is responsive to the digital signals provided thereto from the X-Y key detect decoder 28 and the Y5 decoder 30 via lines 37 and 39 respectively. Bit pattern generator 38 is thus responsive to a binary signal representing the X-Y coordinates of the selected push button control provided thereto via line 37 which determines the 5 data bits of information, or the function controlled, and the selected operating code group information provided thereto via line 39, which determines the start bit and 6th and 7th bits. The pulsed configuration of a typical control signal generated by the bit pattern generator 38 is shown in FIG. 3D and is discussed in detail below. These two digital signals are thus combined by the bit pattern generator 38 which generates an output which is then loaded into a ripple counter, or shift register, 40 via the conductors 41. Bit pattern generator 38, similar to the X-Y key detect decoder 28 and the Y5 decoder 30, is comprised of conventional digital logic circuitry which combines inputs provided by the two aforementioned decoders in generating function control and code group information and providing said information to the shift register 40. As such, the bit pattern generator 38 may be of conventional design and indeed may be accomplished in a large variety of design configurations. The specific design of the bit pattern generator 38 does not form a part of the present invention and is not further described herein. Similarly, the X-Y key detect decoder 28 and the Y5 decoder 30 may be of conventional digital logic circuitry design in receiving and processing the function and code group signals and generating coded digital signals in response thereto and providing the signals to the bit pattern generator 38. Since the operation of and the functions performed by these decoders may be accomplished in a great variety of ways known to those skilled in the design of digital logic circuitry, the specific configuration of these decoders will not be further described herein.

An X-Y mask programmable discriminator 29 is coupled to and responsive to an output signal from the X-Y decoder 28. This mask programmable discriminator 29 establishes the code group selected in response to an output from the X-Y decoder 28 representing a particular selector key 15 engagement if the Y5 port 26 is not connected to one of the X-ports 22. This mode of operation is described in detail below. In the mode of operation where the Y5 decoder 30 is enabled by an output from the Y5 port 26 which is coupled to one of the X-ports 22, the Y5 decoder 30 provides a logic high to one terminal of one of the OR gates 54A-54H. The particular OR gate receiving this signal is determined by the contents of the Y5 decoder 30. The Y5 decoder 30 similarly provides one logic high input signal to NOR gate 50 which consequently outputs a logic low signal to all of the AND gates 52A-52H which, in turn, prevents any signals coming from the X-Y discriminator 29 from reaching OR gates 54A-54H. In this manner, the Y5 decoder 30 with the Y5 port coupled to one of the X-ports 22 accesses the code group generator 32 in reading a predetermined code therefrom which determines the start bit and the 6th and 7th bits, or the code group, of the output pulse train.

The oscillator timing circuit 34 is coupled to and provides timing for the X-Y key detect decoder 28 and the Y5 decoder 30 for the clocking of signals from the respective X- and Y-ports 22, 24. Once the key closure signals are clocked into the respective decoders, oscillator timing circuit 34 clocks the signals through the respective blocks and into the bit pattern generator 38 to which it is also coupled in providing proper signal timing thereto. This allows the bit pattern generator 38 to receive the function control and code group signals from the respective blocks in proper sequence so as to generate and transmit the resulting composite signal to the shift register 40 via lines 41. Shift register 40 receives a clocking signal from oscillator timing circuit 34 permitting it to clock the information loaded from the bit pattern generator 38 and to generate the output pulse pattern within a predetermined time period as determined by the aforementioned clocking signal. The output of the shift register 40 is then provided to the output driver 42 which, in turn, drives a light emitting diode 16, or a plurality of such light emitting diodes, for generating an electromagnetic wave.

The transmitted electromagnetic wave, which is representative of the function control and code group signals selected by means of keyboard 12, is received by a photo-sensitive diode 18, the output of which is provided to the controlled device 20 in a conventional manner. The present invention envisions the use of a plurality of such controlled devices although, for simplicity's sake, only one such device 20 is shown in FIG. 1. Similarly, the present invention is not limited to the use of the infrared spectrum for propagating the control signals, but will operate equally as well with an acoustic type of signal transmission system. The generation of pulse coded control signals and their transmission by whatever propagation medium selected and the subsequent reception and post-processing of these signals in regulating the controlled device may be conventional in nature, does not form a part of the present invention, and therefore will not be described in greater detail.

Referring to FIGS. 3A-3E, there is shown the pulsed configuration of a typical control signal produced in a preferred embodiment of the present invention. The basic element of a control signal is a pulse of width A which actually is a series of 20 bursts each having a period of 25 microseconds. Each bit is comprised of a series of pulses and is 500 microseconds in length.

Table I shows the values of various control signal parameters for an oscillator clocking rate of 640 KHz where the output driver 42 is clocked at an ON/OFF rate of 40 KHz. Thus, with an oscillator clocking rate of 640 KHz and an output pulse cycle of 40 KHz, 20 clock pulses A would occur within the time period of 500 microseconds. The pulse width A equals the inter-pulse time B, which is also 500 microseconds.

TABLE I

| DIMENSION | DURATION |
|---|---|
| A | 500 μSEC. |
| B | 500 μSEC. |
| C | 5.6 MSEC. |
| D | 57.5 MSEC. |
| E | 179.2 MSEC. |
| F | 40.0 MSEC. |

Referring to FIGS. 3B and 3C, it can be seen that each bit is 5.6 milliseconds in length and that a logical 0 value is represented by an initial single pulse followed by a two pulse grouping, while a logical 1 is represented by an initial two pulse grouping followed by a single pulse. The period D represents the time interval during which a pulse code signal is generated in response to a user initiated keyboard control input. F represents the key debounce period following the key scan time interval for key closure. As shown in FIG. 3D, the present invention contemplates the use of a pulse code signal using five basic bits which can be supplemented by means of additional 6th and 7th bits. This expanded code is available by means of a single control input is described in detail in the following paragraphs. Referring to Table II, there is shown a coding scheme which is used in a preferred embodiment of the present invention.

TABLE II

| CODE GROUP | EXTERNAL HARDWARE CONNECTION | TOTAL DATA BITS | START BITS | 6TH BIT | 7TH BIT |
|---|---|---|---|---|---|
| 1 | Y5-X1 | 5 | 2 | None | None |
| 2 | Y5-X2 | 5 | 1 | None | None |
| 3 | Y5-X3 | 6 | 1 | 0 | None |
| 4 | Y5-X4 | 6 | 1 | 1 | None |
| 5 | Y5-X5 | 7 | 1 | 0 | 0 |
| 6 | Y5-X6 | 7 | 1 | 1 | 0 |
| 7 | Y5-X7 | 7 | 1 | 0 | 1 |
| 8 | Y5-X8 | 7 | 1 | 1 | 1 |

The coding scheme of Table II will be explained with reference to FIG. 3D. Each code group represents one of the X1-X8 input/output lines. The Y5 port 26 is coupled to one of these X1-X8 conductors as shown in Table II for generating a control word of varying length. Thus, code groups 1 and 2 are represented by a five bit word while code groups 3 and 4 are represented by six bit words and code groups 5, 6, 7 and 8 are represented by seven bit words. The configuration of the sixth and seventh bits of the various code groups are also shown in Table II. Thus it can be seen that the pulse coded signals are ternary digital signals in which the 6th and 7th bits assume either a logic 1 state, a logic 0 state, or no bit is transmitted in this position. Thus, a command word includes at least 5 data bits and may vary in length from five to seven bits. It should also be noted that for code group 1, two start bits are utilized to initiate a control word while in code groups 2–8 a single start bit is utilized.

The use of either a double or single pulse start bit is an important feature of the present invention in that the remote control system used in some currently available remote control systems utilized solely in combination with a television receiver employ a two pulse start bit. One example of such a television receiver remote control system is the infrared remote control system utilized in the System III chassis television receiver manufactured by Zenith Radio Corp. Thus, the code depicted in Table II is compatible with both an available, conventional television receiver remote control system, namely by using code group 1, while providing for an expanded control device capability by using code groups 2–8. This capability is furthermore available without incorporating additional controls in the remote control keyboard 12, without adding additional data lines between the keyboard 12 and the controller IC 14, and without incorporating a microcomputer in the remote controller IC 14 which would result in substantially increased system complexity and cost.

The system as thus far described envisions the hard wiring of the Y5 port 26 to one of the X1–X8 input/output lines, as shown in dotted line form in FIG. 1. However, the system may also be implemented by not coupling the Y5 port to any of the X1–X8 lines. If the Y5 port 26 is not connected to any of the X1–X8 lines, the system defaults upon selection of a push button control 15 to a mode in which the code group is selected by means of information stored in the mask programmable X-Y discriminator 29 which is enabled via line 21 by the X-Y decoder 28. If the Y5 port is not coupled to any of the X1–X8 lines, the Y5 decoder receives no input from the X-ports 22 and after a short time interval determined by oscillator timing block 34 consequently provides an output of 0 to NOR gate 50 and to each of the OR gates 54A–54H. The 8-input NOR gate 50 then provides a logic 1 to one input terminal of each of the AND gates 52A–52H thus enabling outputs from the X-Y discriminator 29 to select the code group. The X-Y discriminator 29 in response to an input signal from the X-Y decoder 28 then provides a logic 1 to one of the AND gates 52A–52H, which output signal is then transmitted to a corresponding OR gate 54A–54H, thence to the code group generator 32, and then to the bit pattern generator 38. Thus, in the case where the Y5 port 26 is not coupled to an X-port, the Y5 decoder 30 provides no code group information and the system defaults to a condition where code group information is provided by the X-Y discriminator 29, which has been mask programmed to provide code groups based on the location of the key selected.

The code group output signal from the X-Y discriminator 29 is initiated in response to a timing signal received by the discriminator 29 from the oscillator timing circuit 34. Thus, this code group signal is provided from the discriminator 29 to the code group generator 32 only after a predetermined time period following start up of the oscillator timing circuit 34 and then only if a group code signal is not provided to the Y5 decoder 30 from one of the X-ports 22. The output group code signal is determined in the code group generator 32 by the output of the X-Y discriminator 29 in a manner similar to that in the case of the processing of the Y5 decoder output signal with the addition that the address code information is determined by the particular X-Y matrix location. Therefore, by not connecting the Y5 port 26 to any of the X1–X8 lines, any of the eight code groups may be selected in the code group generator 32 as assigned by the X-Y key location mask programmed in the X-Y discriminator 29 and provided to the bit pattern generator 38 in response to the selection of a given push button control 15. A connection made from the Y5 port 26 to any X1–X8 pin overrides the mask option available from the X-Y discriminator 29 and results in the generation of a code in accordance with Table II.

The mask option previously described permits the selection of any 32 of the 256 available codes on an "as desired" basis such that the codes from various code groups may be intermixed and stored in the code group generator 32 and recalled therefrom as previously described. In addition, the start bits and the 6th and 7th bits may be intermixed such that the same 5 bit function code as designated by a particular X-Y key input may be used to control several devices depending upon the code selected from the code group generator 32. This permits the remote control system of the present invention to control several devices without a separate mode control switch for individually addressing those controlled devices.

Referring to Table III, there is shown the code group assignments stored in the X-Y discriminator 29 in a preferred embodiment of the present invention. From this it can be seen that selection of certain, predetermined push button controls will result in the generation of either a five bit or a six bit control word. This permits the selective control of two separate devices, one responsive to five bit control words, the other responsive to six bit control words, by means of the selection of a single control input. The preferred embodiment of the present invention is intended for simultaneous control of a television receiver and a video cassette recorder. Thus, one mode represents television receiver control while the other mode represents video cassette recorder control. By providing appropriate information to the seventh bit location, still another device may be selectively controlled. The scope of the present invention is, of course, not limited to controlling merely two or three separate devices but may be easily extended to cover virtually any desired number of devices by merely expanding the application of the present invention using conventional means.

TABLE III

| FUNCTION | KEYBOARD CLOSURES | DECIMAL EQUIVALENT | FUNCTION CODE PATTERN | | | | | |
|---|---|---|---|---|---|---|---|---|
| | | | 1 | 2 | 3 | 4 | 5 | 6 7 |
| Special #3 | X1-Y1 | 0 | 0 | 0 | 0 | 0 | 0 | 0 |
| PR. CH. DN | X2-Y1 | 1 | 0 | 0 | 0 | 0 | 1 | |
| Vol. Down | X3-Y1 | 2 | 0 | 0 | 0 | 1 | 0 | |
| Auto Off | X4-Y1 | 3 | 0 | 0 | 0 | 1 | 1 | |
| Min | X5-Y1 | 4 | 0 | 0 | 1 | 0 | 0 | 0 |
| Hour | X6-Y1 | 5 | 0 | 0 | 1 | 0 | 1 | 0 |
| All CH. Up | X7-Y1 | 6 | 0 | 0 | 1 | 1 | 0 | 0 |

TABLE III-continued

| FUNCTION | KEYBOARD CLOSURES | DECIMAL EQUIVALENT | FUNCTION CODE PATTERN | | | | | |
|---|---|---|---|---|---|---|---|---|
| | | | 1 | 2 | 3 | 4 | 5 | 6 7 |
| All Ch. Dn | X8-Y1 | 7 | 0 | 0 | 1 | 1 | 1 | 0 |
| | X1-Y2 | 8 | 0 | 1 | 0 | 0 | 0 | 0 |
| PR. CH. UP | X2-Y2 | 9 | 0 | 1 | 0 | 0 | 1 | |
| Vol. Up | X3-Y2 | 10 | 0 | 1 | 0 | 1 | 0 | |
| Mute/Priv. | X4-Y2 | 11 | 0 | 1 | 0 | 1 | 1 | |
| Auto On | X5-Y2 | 12 | 0 | 1 | 1 | 0 | 0 | |
| Auto On | X6-Y2 | 13 | 0 | 1 | 1 | 0 | 1 | 0 |
| Momentary On/Off | X7-Y2 | 14 | 0 | 1 | 1 | 1 | 0 | |
| Screen On | X8-Y2 | 15 | 0 | 1 | 1 | 1 | 1 | |
| 0 | X1-Y3 | 16 | 1 | 0 | 0 | 0 | 0 | |
| 1 | X2-Y3 | 17 | 1 | 0 | 0 | 0 | 1 | |
| 2 | X3-Y3 | 18 | 1 | 0 | 0 | 1 | 0 | |
| 3 | X4-Y3 | 19 | 1 | 0 | 0 | 1 | 1 | |
| 4 | X5-Y3 | 20 | 1 | 0 | 1 | 0 | 0 | |
| 5 | X6-Y3 | 21 | 1 | 0 | 1 | 0 | 1 | |
| 6 | X7-Y3 | 22 | 1 | 0 | 1 | 1 | 0 | |
| 7 | X8-Y3 | 23 | 1 | 0 | 1 | 1 | 1 | |
| 8 | X1-Y4 | 24 | 1 | 1 | 0 | 0 | 0 | |
| 9 | X2-Y4 | 25 | 1 | 1 | 0 | 0 | 1 | |
| Phone | X3-Y4 | 26 | 1 | 1 | 0 | 1 | 0 | 0 |
| Spcl 2 | X4-Y4 | 27 | 1 | 1 | 0 | 1 | 1 | 0 |
| Ent/Recall | X5-Y4 | 28 | 1 | 1 | 1 | 0 | 0 | |
| Mute Clr | X6-Y4 | 29 | 1 | 1 | 1 | 0 | 1 | 0 |
| | X7-Y4 | 30 | 1 | 1 | 1 | 1 | 0 | 0 |
| | X8-Y4 | 31 | 1 | 1 | 1 | 1 | 1 | 0 |

There has thus been shown a multi-function, multi-unit remote control system and method therefor in which individual keyboard controls provide the capability to selectively control one of several devices and one of many functions in each device. This is made possible by uniquely arranging the start bit (or bits) in combination with the various length bit words, with each device responsive to a predetermined start bit and bit word length combination.

While particular embodiments of the present invention have been shown and described, it will be apparent to those skilled in the art that changes and modifications may be made therein without departing from the invention in its broader aspects. The aim of the appended claims, therefor, is to cover all such changes and modifications as fall within the true spirit and scope of the invention.

We claim:

1. A system for remotely controlling a plurality of devices responsive to transmitted multibit digital coded signals, with each device capable of performing a plurality of functions, said system comprising:

a plurality of user responsive selector means for generating binary digital coded control signals in response to a single user input, said coded control signals including address indicia for addressing a particular device and function indicia for controlling a particular function in said addressed device;

first decoding means coupled to said selector means for receiving said coded control signals, said first decoding means responsive to said address indicia for generating a first signal for accessing only one of said plurality of devices;

second decoding means coupled to said selector means for receiving said coded control signals, said second decoding means responsive to said function indicia for generating a second signal for controlling a particular function in said addressed device;

ternary digital signal processing means coupled to said first and second decoding means and responsive to said first and second signals for generating a multibit coded ternary digital control signal in response thereto, said ternary digital control signal including said address and function indicia and comprised of a plurality of information elements having three possible states;

transmitter means coupled to said signal processing means and responsive to said ternary digital control signal for generating and providing said control signal to said plurality of devices; and a timer circuit connected to said first and second decoding means, said ternary digital signal processing means and said transmitter means for providing clocking signals thereto in controlling signal flow therebetween.

2. A system as in claim 1 wherein the information elements of said ternary digital signal include at least one start bit and a predetermined number of data bits with each of said plurality of devices responsive to a single combination of at least one start bit and a predetermined number of data bits.

3. A system as in claim 2 wherein said first decoding means is hardwired to one of said user responsive selector means for receiving and decoding said control signals and generating said first signal representing said address indicia in response thereto.

4. A system as in claim 1 wherein said first decoding means includes memory means for storing a plurality of predetermined address indicia therein with said first decoding means responsive to a user input for recalling one of said predetermined address indicia from said memory means and providing said address indicia to said ternary digital signal processing means in response to a user input.

5. A system as in claim 1 wherein said selector means includes a keyboard having a plurality of user engagable keys in a matrix configuration and wherein said keyboard is bi-directionally scanned for key engagement detection.

6. A system as in claim 1 wherein said control signal is transmitted in the infrared frequency spectrum.

7. A system as in claim 1 wherein said controlled devices include a plurality of home entertainment apparatus including a television receiver and a video cassette recorder.

8. A method for selectively controlling various functions in a plurality of devices responsive to remotely generated multibit digitally coded control signals, said method comprising:

generating a composite coded signal in response to a single user input, said composite coded signal including address and function indicia for selectively accessing one of said devices and for controlling one of said functions in said accessed device, respectively;

decoding said composite signal and extracting said address and function indicia therefrom;

generating a ternary digital signal in response to said decoded address and function indicia, said ternary digital signal comprised of a plurality of information elements having three possible states and arranged in a plurality of predetermined combinations; and transmitting said ternary digital signal to said plurality of devices with each device responsive to only one of said predetermined combinations of said information elements for selectively controlling one of said functions in one of said devices.

9. The method of claim 8 further comprising varying the number of said information elements in said ternary digital signal in response to said address and function indicia for addressing and controlling each device as a function of the number of information elements in said ternary digital signal.

10. The method of claim 9 further comprising selectively incorporating at least one start bit at the beginning of each ternary digital signal for addressing and controlling each device as a function of the number of information elements and start bits in said ternary digital signal.

11. The method of claim 8 wherein the generation and decoding of said composite signal includes recalling said address indicia from a data storage circuit in response to said user input and combining said address and function indicia in generating said ternary digital signal.

12. The method of claim 8 wherein said ternary digital signal is transmitted to said plurality of devices at a frequency in the infrared spectrum.

* * * * *